W. S. HARLEY.
SPRING FRAME FOR MOTOR CYCLES AND LIKE VEHICLES.
APPLICATION FILED DEC. 3, 1917.

1,266,800.

Patented May 21, 1918.
2 SHEETS—SHEET 1.

W. S. HARLEY.
SPRING FRAME FOR MOTOR CYCLES AND LIKE VEHICLES.
APPLICATION FILED DEC. 3, 1917.

1,266,800. Patented May 21, 1918.
2 SHEETS—SHEET 2.

UNITED STATES PATENT OFFICE.

WILLIAM S. HARLEY, OF MILWAUKEE, WISCONSIN, ASSIGNOR TO HARLEY-DAVIDSON MOTOR COMPANY, OF MILWAUKEE, WISCONSIN.

SPRING-FRAME FOR MOTOR-CYCLES AND LIKE VEHICLES.

1,266,800.              Specification of Letters Patent.         Patented May 21, 1918.

Application filed December 3, 1917. Serial No. 205,206.

*To all whom it may concern:*

Be it known that I, WILLIAM S. HARLEY, a citizen of the United States, and resident of Milwaukee, in the county of Milwaukee and State of Wisconsin, have invented certain new and useful Improvements in Spring-Frames for Motor-Cycles and like Vehicles; and I do hereby declare that the following is a full, clear and exact description thereof.

My invention refers to new and useful improvements in spring frames for cycle vehicles, particularly motorcycles.

The principal object of the invention is to provide an improved compensating rear fork member attached to the main portion of a cycle frame so that the jolts and shocks incident to travel over rough roads will be practically obviated such construction being of considerable importance over the usual shock absorbing means.

A less important object of the invention is to provide an improved arrangement of springs for carrying out the main object.

With these and other objects and advantages in view the invention resides in the novel features of construction, combination and arrangement of parts as will be hereinafter more particularly described and claimed and shown in the drawings, wherein:

Referring more particularly to the several figures of the drawings it will be seen that letter A designates broadly the main section of a cycle frame and the letter B the rear wheel carrying section or rear fork, the object being, as herein before mentioned to so connect these two parts of the frame so that the shocks received by the rear wheel W will not be transmitted to the rider.

The main section A of the frame as is usual in vehicles of this construction consists of a reach bar 1 of tubular formation, a horizontal bar 2, a hollow seat mast 3 to which the rear ends of bars 1 and 2 are connected by welding, brazing, or any other preferred manner and means (not shown) for joining the forward ends of said bars.

Figure 1:
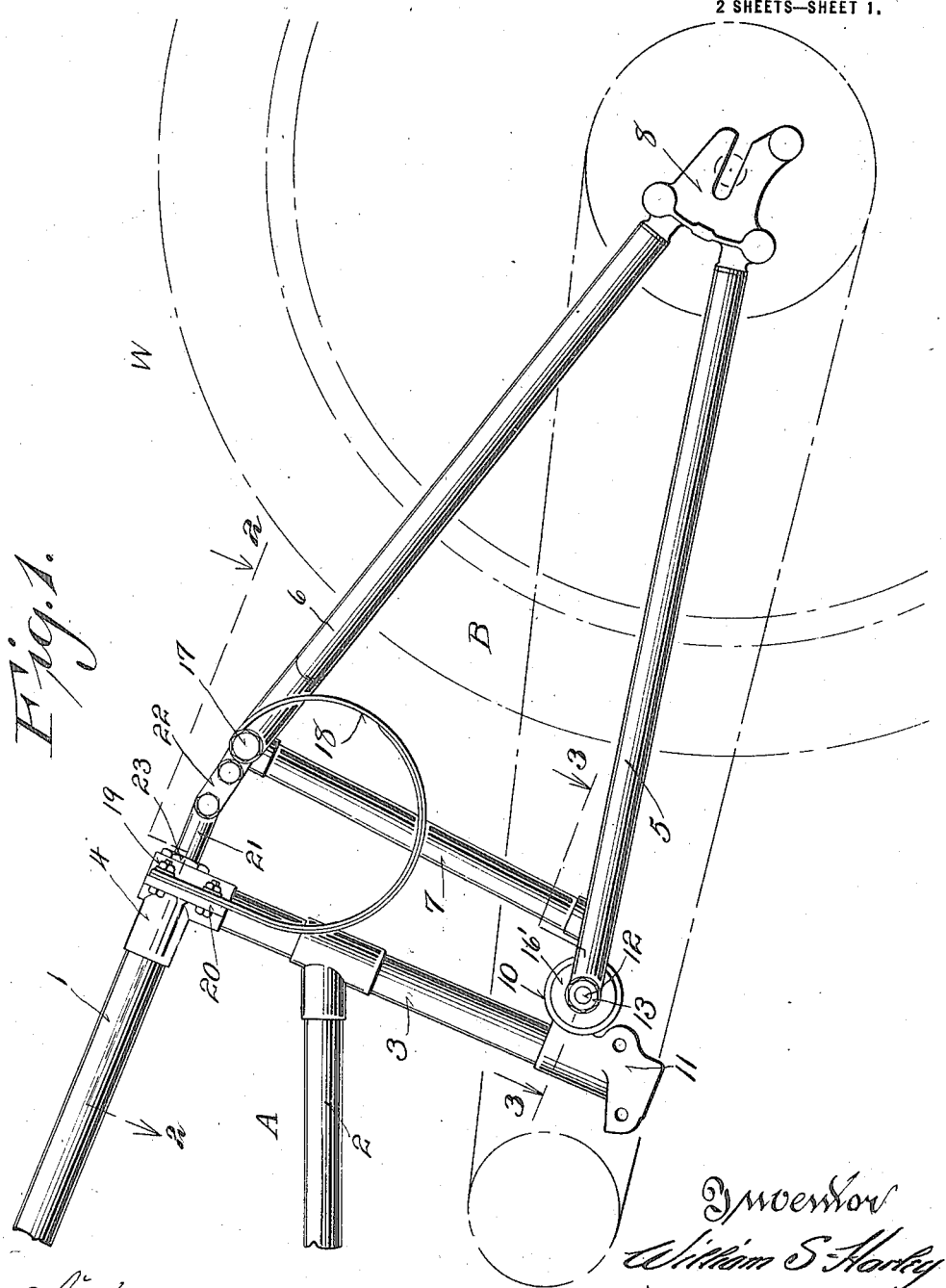
Figure 1 represents a fragmentary side elevational view of a motorcycle frame embodying the features of my invention.

In the preferred formation of this section A, the reach bar 1 is connected with the seat mast through the medium of a coupling 4 which is substantially right angular as shown in Fig. 1.

The wheel carrying section B of the frame comprises lower fork bars 5, upper fork bars 6, a substantially vertically disposed strut 7, and axle plates 8. The upper and lower fork bars converge toward their outer ends and are connected together by means of the plates 8. The forward ends of the lower fork bars are connected to each other by means of brace bars 9 from the center of one of which rises the strut 7.

Figure 3:
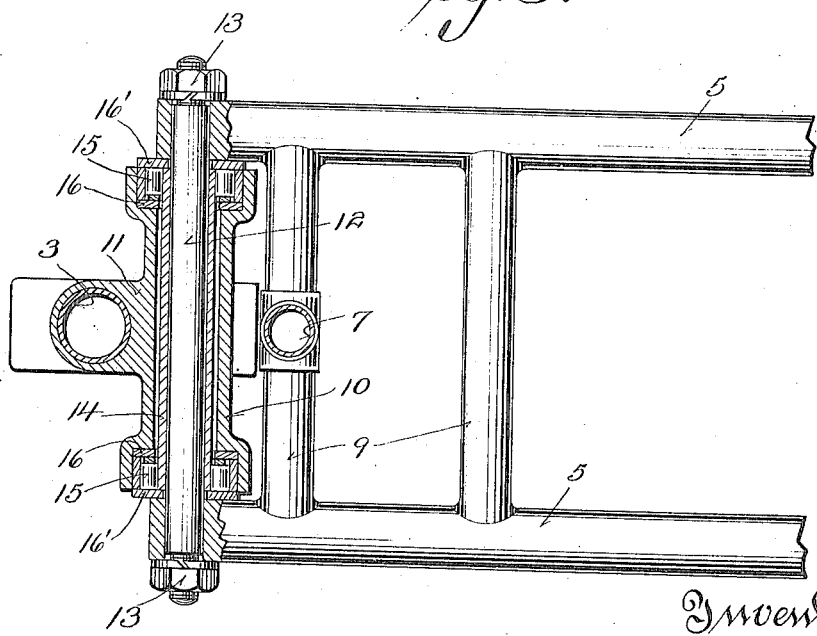
Fig. 3 is a similar view taken on the line 3—3 of Fig. 1.

The section B is hinged to the main section preferably as shown in Figs. 1 and 3, this means consisting of a bearing sleeve 10 carried by a bracket 11 secured to the lower end of the seat mast 3 and a pivot shaft 12 which connects the inner free ends of the lower fork bars 5. The shaft 12 is preferably fixed against rotation in the fork bars, but is readily removable therefrom when the retaining nuts 13 are detached. The intermediate portion of the shaft has a sleeve 14 fixed thereto against which roller bearings 15 mounted in the outer ends of the sleeve 10 revolve. The end thrust of the roller bearings 15 is taken up by inner and outer washers 16 and 16' respectively, thus preventing any wear on the bearing sleeve 10 or the inner sides of the fork bars 5. After excessive wear on the washers they may be replaced by dissembling the parts as will be obvious from Fig. 3.

Figure 2:
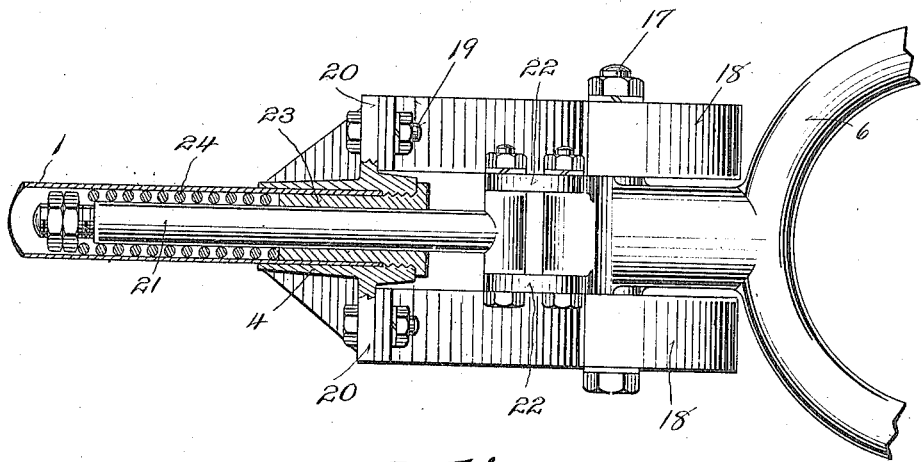
Fig. 2 is a substantially horizontal sectional view taken on the plane of the line 2—2 of Fig. 1.

Between the upper ends of the two sections of the frame there is a spring connection which will allow oscillation of the rear fork in a vertical direction with respect to the main section A, but will aid the hinged connection between the lower ends in preventing side play of the sections with respect to each other. In effecting this connection a bolt 17 is extended transversely through the junction of the upper fork bars with the strut 7 to form laterally extending arms to which one end of arcuate leaf springs 18 is attached, said springs having eyes through which the bolt 17 extends. From Fig. 2 it will be seen that one of the springs 18 is disposed on each side of the sections. The other ends of the springs are rigidly secured by means of bolts and nuts 19 to attaching flanges 20 and which extend laterally in opposite directions from opposite sides of the substantially vertical portion of the coupling 4. From Fig. 2 it will be seen that these flanges are alined and the plane thereof extends transversely of the cycle frame. These springs 18 prevent excessive upward movement of the wheel carrying section B.

The above mentioned spring connection between the two sections of the frame also includes means for preventing excessive downward movement of the section B, or in other words means for retarding the movement of the upper end of the strut away from the adjacent end of the seat mast. This consists of a plunger 21 slidably disposed in the hollow reach bar 1 and linked as at 22 to the section B at the junction of the strut and upper fork bars 6. The inner end of the plunger is headed and between such head and a stop 23, disposed in the outer end of the reach bar, is a helical expansion spring 24, the same being adapted to exert its tension to draw the plunger inwardly.

From this description it will be seen that the springs 18 and 24 counter-act each other and thereby compensate for the jolts and jars received by the rear wheel W. This absolutely relieves the rider of the vehicle from a great deal of discomfort.

I claim:—

1. In a vehicle of the class described, the combination with a main section having a hollow reach bar, a wheel carrying section hinged to the main section adjacent the bottom thereof and a plunger at the upper end of said wheel carrying section slidable in said hollow reach bar, of a coil spring surrounding the plunger and disposed within the hollow reach bar, said spring retarding the movement of the wheel carrying section in one direction relative to the main section, and a leaf spring having one end connected with the main section and the other end with the other section to retard movement of the latter section in the other direction.

2. In a vehicle of the class described, the combination with a main section including a seat mast, and a wheel carrying section hinged to the first section adjacent its lower end, said section including a substantially vertically disposed strut, of attaching flanges extending laterally in opposite directions from opposite sides of the seat mast adjacent its upper end, arms extending laterally in opposite directions from the upper end portion of said strut, and a leaf spring disposed on each side of the sections, one end of each spring being secured to the adjacent attaching flange, the other ends being attached to said arms.

In testimony that I claim the foregoing I have hereunto set my hand at Milwaukee, in the county of Milwaukee, and State of Wisconsin.

WILLIAM S. HARLEY.

Copies of this patent may be obtained for five cents each, by addressing the "Commissioner of Patents. Washington, D. C."